United States Patent
Rivera Iunnissi et al.

(10) Patent No.: US 12,348,122 B2
(45) Date of Patent: Jul. 1, 2025

(54) PARTIAL POWER DC-DC CONVERTER WITH CONTROLLABLE TOPOLOGY

(71) Applicant: UNIVERSIDAD TÉCNICA FEDERICO SANTA MARÍA, Valparaíso (CL)

(72) Inventors: Sebastián Andre Rivera Iunnissi, Santiago (CL); Hugues Jean-Marie Renaudineau, Valparaíso (CL); Freddy Arturo Flores Bahamonde, Santiago (CL); Samir Felipe Kouro Renaer, Viña del Mar (CL)

(73) Assignee: UNIVERSIDAD TÉCNICA FEDERICO SANTA MARÍA, Valparaíso (CL)

( * ) Notice: Subject to any disclaimer, the term of this patent is extended or adjusted under 35 U.S.C. 154(b) by 123 days.

(21) Appl. No.: 18/270,652

(22) PCT Filed: Dec. 28, 2021

(86) PCT No.: PCT/CL2021/050130
§ 371 (c)(1),
(2) Date: Jun. 30, 2023

(87) PCT Pub. No.: WO2022/140875
PCT Pub. Date: Jul. 7, 2022

(65) Prior Publication Data
US 2024/0063707 A1    Feb. 22, 2024

(30) Foreign Application Priority Data
Dec. 30, 2020    (CL) ................................... 3441-2020

(51) Int. Cl.
*H02M 3/335*    (2006.01)
*H02M 1/00*    (2006.01)
*H02M 3/158*    (2006.01)

(52) U.S. Cl.
CPC ....... *H02M 1/0083* (2021.05); *H02M 1/0074* (2021.05); *H02M 1/0077* (2021.05); *H02M 3/33584* (2013.01); *H02M 3/158* (2013.01)

(58) Field of Classification Search
CPC .......................... H02M 3/158; H02M 3/33584
See application file for complete search history.

(56) References Cited

U.S. PATENT DOCUMENTS 6,370,047 B2 *    4/2002    Mallory ................ H02M 7/493
                                                                363/71
6,963,497 B1 *    11/2005    Herbert ................... H02M 3/07
                                                                363/133

(Continued)

FOREIGN PATENT DOCUMENTS

WO    2015172254 A1    11/2015
WO    2022140874 A1    7/2022

OTHER PUBLICATIONS

Zapata et al., "Analysis of Partial Power DC-DC Converters for Two-Stage Photovoltaic Systems," IEEE Journal of Emerging and Selected Topics in Power Electronics, vol. 7, No. 1, Mar. 2019, pp. 591-603.

(Continued)

*Primary Examiner* — Gary A Nash
(74) *Attorney, Agent, or Firm* — Procopio, Cory, Hargreaves & Savitch LLP

(57) ABSTRACT

The invention provides a partial power DC-DC converter with controllable topology comprising: a galvanically isolated DC-DC converter having a positive input, a negative input, a positive output, and a negative output; a first DC voltage input electrically connected to said negative output of the DC-DC converter; an input reference; a first DC voltage output electrically connected to said positive output of the DC-DC converter; and an output reference electrically connected to said input reference and said negative input of (Continued)

the DC-DC converter; wherein said partial power DC-DC converter additionally comprises: a first switch arranged to selectively connect said first DC voltage input to said positive input of the DC-DC converter; and a second switch arranged to selectively connect said positive output of the DC-DC converter to said positive input of the DC-DC converter.

6 Claims, 3 Drawing Sheets

(56) References Cited

U.S. PATENT DOCUMENTS

| | | | |
|---|---|---|---|
| 7,042,199 B1* | 5/2006 | Birchenough | H02M 3/1582 |
| | | | 363/132 |
| 9,397,548 B2* | 7/2016 | Li | H02M 3/06 |
| 9,960,687 B2 | 5/2018 | Elasser et al. | |
| 10,116,221 B2 | 10/2018 | Iwaya et al. | |
| 10,199,950 B1* | 2/2019 | Vinciarelli | H02M 3/33576 |
| 10,384,628 B2 | 8/2019 | Mohrmann et al. | |

OTHER PUBLICATIONS

International Search Report dated Mar. 23, 2022, in PCT/CL2021/050130.

* cited by examiner (State of the Art)

(State of the Art)

PARTIAL POWER DC-DC CONVERTER WITH CONTROLLABLE TOPOLOGY

TECHNICAL FIELD OF INVENTION

The present invention relates to the field of electrical power generation, conversion, or distribution; more specifically to the field of converting a DC input into a DC output, and in particular provides a partial power DC-DC converter with controllable topology.

BACKGROUND OF THE INVENTION

Within the field of power conversion, partial power converters have become relevant in recent times. In general, partial power converters are known to have intrinsic advantages, such as reduced power losses, system size and cost. The underlying principle is that power is split between a direct power link between the input and output, and a portion that is processed by a DC-DC converter. This is achieved by connecting one of the inputs of the DC-DC converter to one of the outputs of the same.

There are two types of partial power DC-DC converters, namely, type I (seen in FIG. 1), where the power splitting is performed on the input side to the partial power DC-DC converter, and type II (seen in FIG. 2), where the power splitting is performed on the output side of the partial power converter (usually referred to as DC-link). Additionally, within each configuration (type I or type II) there is a step-up configuration, in which the output voltage is higher than the input voltage, and a step-down configuration, in which the output voltage is lower than the input voltage. There is, in addition, for each configuration (type I or type II) a step-up-step-down configuration in which the output voltage can be either higher or lower than the input voltage.

One of the characteristics of partial power DC-DC converters is that the relation between the input and output voltage, and the converter power, depends only on the connection topology, but not on the type of DC-DC converter used.

In the prior art, applications of partial power DC-DC converters to photovoltaic electric power generation and electromobility are known. For example, document U.S. Pat. No. 9,960,687 describes a type I partial power DC-DC converter that uses a galvanically isolated bidirectional DC-DC converter.

The inventors of the present invention have discovered, however, that in some applications it is preferable to have a partial power DC-DC converter whose topology is controllable between a type I and a type II. A partial power DC-DC converter with both characteristics, however, is not described in the prior art. Accordingly, a partial power DC-DC converter whose topology is controllable between type I and type II is required.

SUMMARY OF THE INVENTION

The present invention provides a partial power DC-DC converter with controllable topology, characterized in that it comprises: a galvanically isolated DC-DC converter having a positive input, a negative input, a positive output, and a negative output; a first DC voltage input electrically connected to said negative output of said DC-DC converter; an input reference; a first DC voltage output electrically connected to said positive output of said DC-DC converter; and an output reference electrically connected to said input reference and to said negative input of said DC-DC converter; wherein said partial power DC-DC converter additionally comprises: a first switch arranged to selectively connect said first DC voltage input to said positive input of said DC-DC converter; and a second switch arranged to selectively connect said positive output of said DC-DC converter to said positive input of said DC-DC converter; and wherein said DC-DC converter is bidirectional in power and bipolar in voltage.

In a preferred embodiment, the partial power converter is characterized in that said first switch and said second switch are unidirectional switches. In a more preferred embodiment, the partial power converter is characterized in that each of said unidirectional switches is formed by a field effect transistor anti-parallel to a rectifier diode.

In another preferred embodiment, the partial power converter is characterized in that said first switch and said second switch are bidirectional switches.

In a further preferred embodiment, the partial power converter is characterized in that said DC-DC converter connected in partial configuration is selected from the group consisting of forward converters, push-pull converters, H-bridge converters, flyback converters, half bridge converters, and Ćuk converters.

In another preferred embodiment, the partial power converter is characterized in that said DC-DC converter comprises a transformer having a primary and a secondary, a first H-bridge connected to the primary of said transformer, and a second H-bridge connected to the secondary of said transformer.

DETAILED DESCRIPTION OF THE INVENTION

The present invention will be described below in detail, referring for this purpose to the figures accompanying the present invention.

Figure 3:
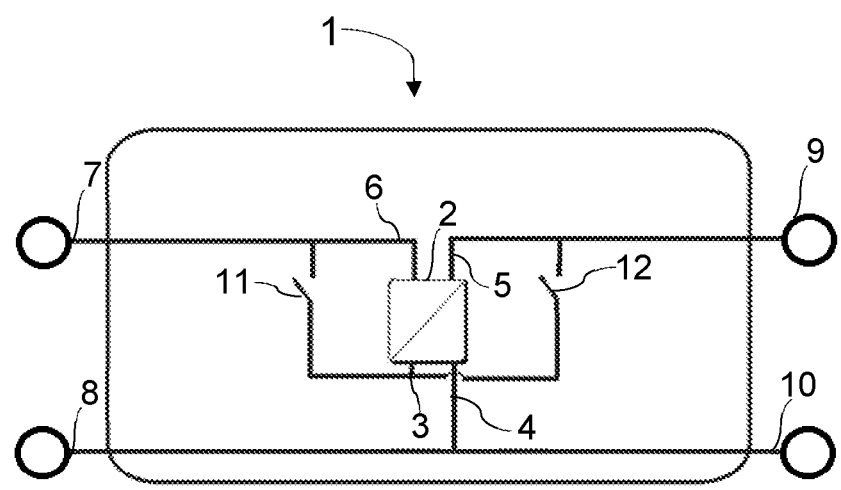
FIG. 3 schematically illustrates an embodiment of the partial power converter with controllable topology which is the subject matter of the present invention.

In a first subject matter of the present invention, as schematically illustrated in FIG. 3, a partial power DC-DC converter with controllable topology (1) is provided, comprising, essentially: a galvanically isolated DC-DC converter (2) having a positive input (3), a negative input (4), a positive output (5), and a negative output (6); a first DC voltage input (7) electrically connected to said negative output (6) of said DC-DC converter (2); an input reference (8); a first DC voltage output (9) electrically connected to said positive output (5) of said DC-DC converter (2); and an output reference (10) electrically connected to said input reference (8) and to said negative input (4) of said DC-DC converter (2), wherein said partial power DC-DC converter (1) additionally comprises: a first switch (11) arranged to selectively connect the first DC voltage input (7) to said positive input (3) of said DC-DC converter (2); and a second switch (12) arranged to selectively connect said positive output (5) of said DC-DC converter (2) to said positive input (3) of said DC-DC converter (2).

Hereinafter, for reasons of simplicity and without limiting the scope of the present invention, reference will be made to the partial power DC-DC converter (1) with controllable topology which is the subject of the present invention as a partial power DC-DC converter (1).

In the context of the present invention, a DC-DC converter will be understood as a set of electrical and electronic components arranged such that, in response to a continuous (DC) input signal it generates a DC output signal. Normally, the relation between the input voltage and the output voltage of a DC-DC converter is controlled by the ratio between the opening time and the closing time of one or more switches forming part of said DC-DC converter.

The DC-DC converter (2) forming part of the partial power DC-DC converter (1) which is the subject of the present invention, features two inputs which, in the context of the present invention and without limiting the scope of the present invention, will be referred to as positive input (3) and negative input (4). Furthermore, the DC-DC converter (2) features two outputs which, in the context of the present invention and without limiting the scope of the same, will be referred to as positive output (5) and negative output (6).

The DC-DC converter (2) may be any type of DC-DC converter (2) having galvanic isolation, without limiting the scope of the present invention. In a more preferred embodiment, without limiting the scope of the present invention, said DC-DC converter (2) may be a galvanically isolated converter which may be selected, for example and without limiting the scope of the present invention, from the group consisting of forward converters, push-pull converters, H-bridge converters, flyback converters, half bridge converters and Ćuk converters. Additionally, said DC-DC converter (2) is a bidirectional converter in power and bipolar in voltage.

For example, and without limiting the scope of the present invention, the partial power DC-DC converter (1) that is the subject of the present invention can be used to connect a solar photovoltaic module to a DC bus. In another example, without limiting the scope of the present invention, the partial power DC-DC converter (1) that is the subject of the present invention may be used to connect a battery to an inverter in an electric vehicle. In both cases, said DC-DC converter (2) is a bidirectional converter in power.

In the context of the present invention, without limiting the scope of the same, it will be understood as bidirectional in power, or indistinctly as bidirectional, a component having inputs and outputs and wherein power can flow both from the input to the output and from the output to the input. Moreover, without limiting the scope of the present invention, it will be understood that a component is bipolar in voltage, or indistinctly bipolar, when the voltage measured between a first output and a second output of said component can be both positive and negative.

In a preferred embodiment, without limiting the scope of the present invention, said DC-DC converter (2) may comprise a transformer (21) having a primary and a secondary, a first H-bridge (22) connected to the primary of said transformer (21), and a second H-bridge (23) connected to the secondary of said transformer (21). Additionally, said second H-bridge (23) is bidirectional and bipolar. The relation between the number of turns of the primary and the secondary of said transformer (21) does not limit the scope of the present invention.

The partial power DC-DC converter (1) which is the subject of the present invention further comprises, in addition, a first DC voltage input (7) electrically connected to the negative output (6) of the DC-DC converter (2); and a first DC voltage output (9) electrically connected to the positive output (5) of said DC-DC converter (2). Furthermore, the partial power DC-DC converter (1) which is the subject of the present invention comprises an input reference (8) and an output reference (10) electrically connected to said input reference (8) and to the negative input (4) of the DC-DC converter (2). In this way, for example and without limiting the scope of the present invention, the partial power DC-DC converter (1) which is the subject of the present invention allows the connection between two DC devices, which are connected, respectively, to said first DC voltage input (7) and to said input reference (8); and to said first DC voltage output (9) and to said output reference (10).

As previously mentioned, the partial power DC-DC converter (1) that is the subject of the present invention additionally comprises a set of switches (11, 12) that allow to control the topology of the partial power DC-DC converter (1) that is the subject of the present invention between a type I topology and a type II topology. A first switch (11) is arranged to selectively connect the first DC voltage input (7) with the positive input (3) of the DC-DC converter (2). A second switch (12) is arranged to selectively connect the positive output (5) of said DC-DC converter (2) with the positive input (3) of said DC-DC converter.

In the context of the present invention, the term selective connection is to be understood as a connection which is controlled by the switching state of a switch. In this sense, for example and without limiting the scope of the present invention, when the first switch (11) is in the closed position, an electrical connection is provided between the first DC voltage input (7) and the positive input (3) of the DC-DC converter (2). In contrast, when the first switch (11) is in the open position, the electrical connection between the first DC voltage input (7) and the positive input (3) of said DC-DC converter (2) is interrupted. Similarly, without limiting the scope of the present invention, the electrical connection between the positive output (5) of said DC-DC converter (2) and the positive input (3) of said DC-DC converter will be controlled by the switching state of the second switch (12).

Moreover, the nature of said first switch (11) and said second switch (12) does not limit the scope of the present invention. Said first switch (11) and second switch (12) may or may not be implemented in the same manner without limiting the scope of the present invention.

In a preferred embodiment, without limiting the scope of the present invention, said first switch (11) and said second switch (12) may be unidirectional switches. Said configuration is obtained, for example and without limiting the scope of the present invention, by arranging a transistor parallel to a rectifying diode. Said transistor may be a bipolar transistor or a field effect transistor without limiting the scope of the present invention. In a preferred embodiment, without limiting the scope of the present invention, said transistor is a field effect transistor and said rectifier diode is connected anti-parallel to the source and to the drain of said field effect transistor.

However, in other preferred embodiments, said first switch (11) and second switch (12) may be bidirectional switches. Said configuration may be obtained, for example and without limiting the scope of the present invention, by arranging two unidirectional switches parallel to each other, wherein said unidirectional switches allow current flow in opposite directions to each other. Furthermore, in this preferred embodiment, said two unidirectional switches connected in parallel must be controlled in such a way that their switching state is the same at all times.

As previously mentioned, the switching state of said first switch (11) and second switch (12) allow to control the topology of the partial power DC-DC converter which is the subject of the present invention between a type I topology and a type II topology. However, advantageously and without limiting the scope of the present invention, the partial power DC-DC converter (1) which is the subject of the present invention has a third mode of operation which will be referred to, without limiting the scope of the present invention, as bypass. In said bypass configuration, the DC device, which is connected to the first voltage input (7) and to the first reference (8), is directly connected to the DC device that is connected to the first voltage output (9) and to the second reference (10), independently of the operation of the DC-DC converter (2).

Figure 1:
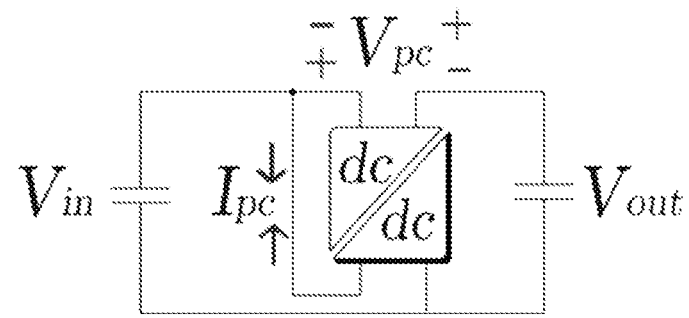
FIG. 1 illustrates a type I partial power converter of the prior art.

In order to bring the partial power DC-DC converter (1) that is the subject of the present invention to a type I topology, said first switch (11) must be kept closed and said second switch (12) open. In this way, the partial power DC-DC converter (1), which is schematically illustrated in FIG. 3, will acquire the topology illustrated in FIG. 1.

Figure 2:
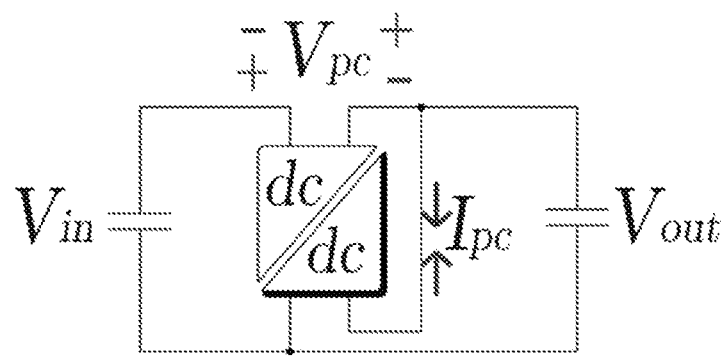
FIG. 2 illustrates a type II partial power converter of the prior art.

In order to bring the partial power DC-DC converter (1) that is the subject of the present invention to a type II topology, said first switch (11) must be kept open and said second switch (12) closed. In this way, the partial power DC-DC converter (1), which is schematically illustrated in FIG. 3, will acquire the topology illustrated in FIG. 2.

Finally, in order to bring the partial power DC-DC converter (1) that is the subject of the present invention to a bypass topology, said first switch (11) and said second switch (12) must be kept closed.

According to the previous description, it is possible to obtain a partial power DC-DC converter (1) whose topology is controllable between a type I, a type II, and a bypass topology, and which allows the connection of two DC devices.

Furthermore, in other preferred embodiments and without limiting the scope of the present invention, it is possible to provide other configurations for the interconnection between the DC devices. To this end, a plurality of partial power DC-DC converters (1a, 1b, 1c), each according to the present invention, can be arranged and connected according to the desired configuration.

Figure 7:
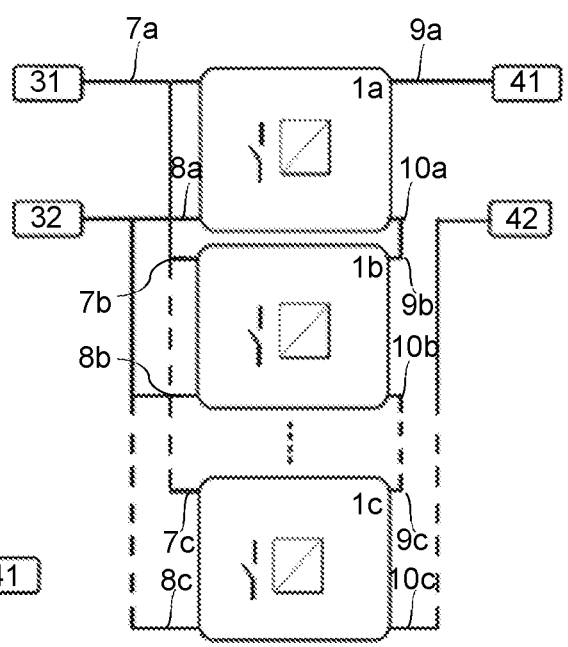
FIG. 7 illustrates the interconnection of a plurality of partial power DC-DC converters in accordance with the present invention in a parallel-to-input, series-to-output configuration.

In a first exemplary embodiment, as illustrated in FIG. 7 and without limiting the scope of the present invention, said plurality of partial power DC-DC converters (1a, 1b, 1c) may be connected in an Input Series, Output Series (ISOS) configuration. In this configuration, the positive DC terminal of the first DC device is connected to the first DC voltage input (7a) of the first partial power DC-DC converter (1a) of the plurality. On its part, the negative DC terminal of the first DC device is connected to the input reference (8c) of the last partial power DC-DC converter (1c). Similarly, the positive DC terminal of the second DC device is connected to the first DC voltage output (9a) of the first partial power DC-DC converter (1a) and the negative DC terminal of the second DC device is connected to the output reference (10c) of the last partial power DC-DC converter (1c). In turn, the input reference (8a) of the first partial power DC-DC converter (1a) is connected to the first voltage input (7b) of the second partial power DC-DC converter (1b); the input reference (8b) of the second partial power DC-DC converter (1b) to the first voltage input (7c) of the third partial power DC-DC converter (1c), and so on until all inputs of the plurality of partial power DC-DC converters (1a, 1b, 1c) are connected. Similarly, the output reference (10a) of the first partial power DC-DC converter (1a) is connected to the first voltage output (9b) of the second partial power DC-DC converter (1b); the output reference (8b) of the second partial power DC-DC converter (1b) to the first voltage output (9c) of the third partial power DC-DC converter (1c), and so on until all outputs of the plurality of partial power DC-DC converters (1a, 1b, 1c) are connected.

Figure 8:
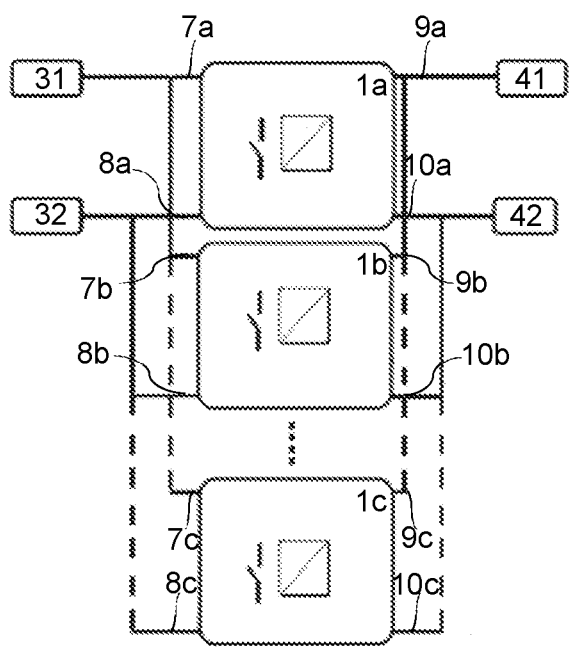
FIG. 8 illustrates the interconnection of a plurality of partial power DC-DC converters in accordance with the present invention in a parallel-to-input, parallel-to-output configuration.

In a second exemplary embodiment, as illustrated in FIG. 8 and without limiting the scope of the present invention, said plurality of partial power DC-DC converters (1a, 1b, 1c) may be connected in an Input Series, Output Parallel (ISOP) configuration. In this configuration, the positive DC terminal of the first DC device is connected to the first DC voltage input (7a) of the first partial power DC-DC converter (1a) of the plurality. On its part, the negative DC terminal of the first DC device is connected to the input reference (8c) of the last partial power DC-DC converter (1c). On the other hand, the positive DC terminal of the second DC device is connected to each of the first DC voltage outputs (9a, 9b, 9c) of the partial power DC-DC converters (1a, 1b, 1c) forming part of said plurality, and the negative DC terminal of the second DC device is connected to each of the output references (10a, 10b, 10c) of the partial power DC-DC converters (1a, 1b, 1c) forming part of said plurality. In turn, the input reference (8a) of the first partial power DC-DC converter (1a) is connected to the first voltage input (7b) of the second partial power DC-DC converter (1b); the input reference (8b) of the second partial power DC-DC converter (1b) to the first voltage input (7c) of the third partial power DC-DC converter (1c), and so on until all inputs of the plurality of partial power DC-DC converters (1a, 1b, 1c) are connected.

In a third exemplary embodiment, as illustrated in FIG. 9 and without limiting the scope of the present invention, said plurality of partial power DC-DC converters (1a, 1b, 1c) may be connected in an Input Parallel, Output Series (IPOS) configuration. In this configuration, the positive DC terminal of the first DC device is connected to each of the first DC voltage inputs (7a, 7b, 7c) of the partial power DC-DC converters (1a, 1b, 1c) of the plurality. On its part, the negative DC terminal of the first DC device is connected to each of the input references (8a, 8b, 8c) of the partial power DC-DC converters (1a, 1b, 1c) of said plurality. On the other hand, the positive DC terminal of the second DC device is connected to the first DC voltage output (9a) of the first partial power DC-DC converter (1a) and the negative DC terminal of the second DC device is connected to the output reference (10c) of the last partial power DC-DC converter (1c). In turn, the output reference (10a) of the first partial power DC-DC converter (1a) is connected to the first voltage output (9b) of the second partial power DC-DC converter (1b), the output reference (8b) of the second partial power DC-DC converter (1*b*) to the first voltage output (9*c*) of the third partial power DC-DC converter (1*c*), and so on until all outputs of the plurality of partial power DC-DC converters (1*a*, 1*b*, 1*c*) are connected.

In a fourth exemplary embodiment, as illustrated in FIG. 10 and without limiting the scope of the present invention, said plurality of partial power DC-DC converters (1*a*, 1*b*, 1*c*) may be connected in an Input Parallel, Output Parallel (I POP) configuration. In this configuration, the positive DC terminal of the first DC device is connected to each of the first DC voltage inputs (7*a*, 7*b*, 7*c*) of the partial power DC-DC converters (1*a*, 1*b*, 1*c*) of the plurality. On its part, the negative DC terminal of the first DC device is connected to each of the input references (8*a*, 8*b*, 8*c*) of the partial power DC-DC converters (1*a*, 1*b*, 1*c*). Similarly, the positive DC terminal of the second DC device is connected to each of the first DC voltage outputs (9*a*, 9*b*, 9*c*) of the partial power DC-DC converters (1*a*, 1*b*, 1*c*) of said plurality and the negative DC terminal of the second DC device is connected to each of the output references (10*a*, 10*b*, 10*c*) of the partial power DC-DC converters (1*a*, 1*b*, 1*c*) of said plurality.

According to the previously detailed description, it is possible to obtain a partial power DC-DC converter (1) whose topology is controllable by means of the switching state of said first switch (11) and second switch (12).

It should be understood that the various options described for the technical characteristics of the partial power DC-DC converter (1) which is the subject of the present invention may be combined with each other, or with others known to a person ordinarily skilled in the art, in any manner envisaged without limiting the scope of the present invention.

Examples of embodiments of the present invention will be described below. It should be understood that said examples of embodiments are intended to provide a better understanding of the invention and do not limit the scope of the same. Additionally, technical features described in different examples may be combined with each other, or with others previously described, in any manner envisioned by a person ordinarily skilled in the art without limiting the scope of the present invention.

Example 1: Use of the Partial Power DC-DC Converter in Battery Arrays

Figure 4:
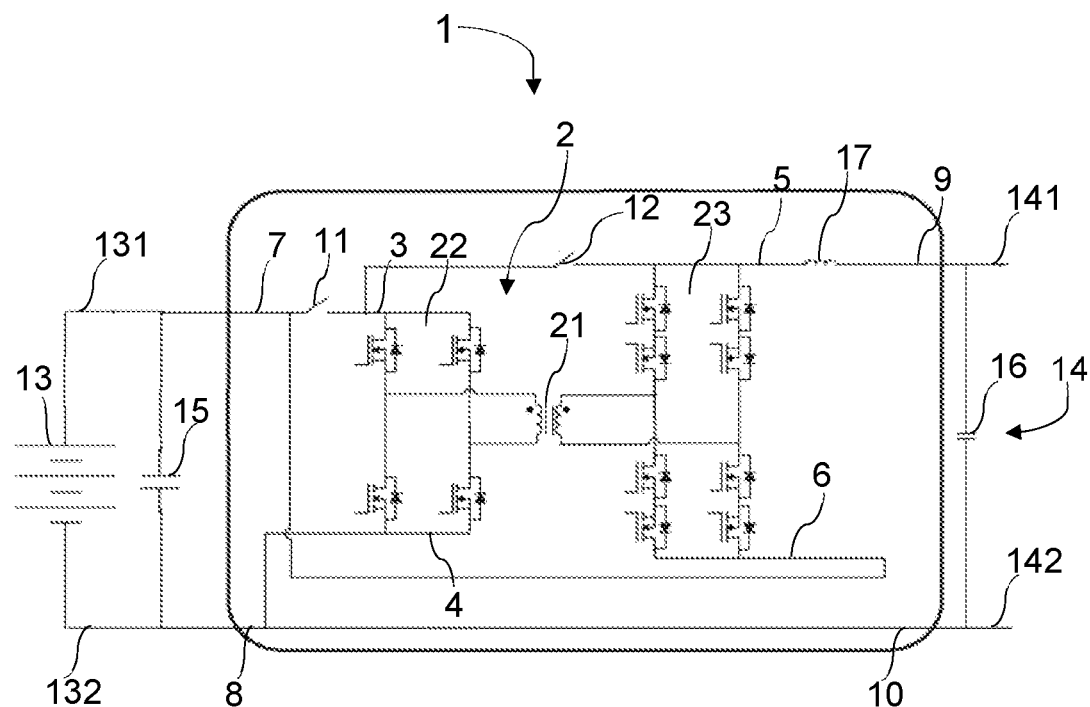
FIG. 4 illustrates an exemplary embodiment of the partial power converter with controllable topology which is the subject matter of the present invention.
Figure 5:
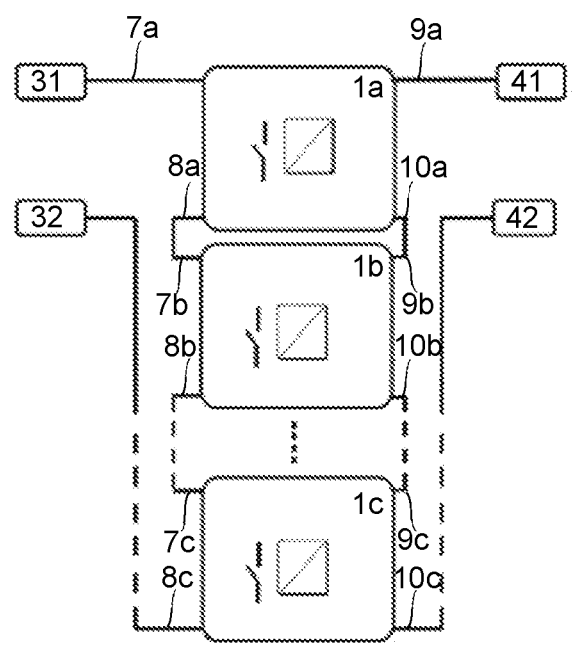
FIG. 5 illustrates the interconnection of a plurality of partial power DC-DC converters in accordance with the present invention in a series-to-input, series-to-output configuration.
Figure 6:
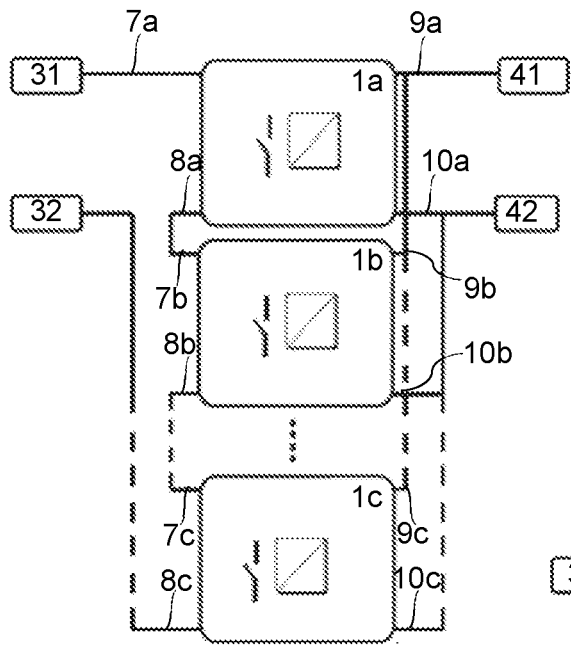
FIG. 6 illustrates the interconnection of a plurality of partial power DC-DC converters in accordance with the present invention in a series-to-input, parallel-to-output configuration.

As schematically illustrated in FIG. 4, the partial power DC-DC converter that is the subject matter of the present invention can be used to connect a group of cells or battery array (13) with a DC voltage line or bus (14). For this purpose, positive (131) and negative (132) terminals of said group of cells or battery array are connected to the first voltage input (7) and the input reference (8), respectively, of the partial power DC-DC converter (1). In turn, the positive (141) and negative (142) terminals of the DC voltage bus (14) are connected, respectively, to the first voltage output (9) and the output reference (10) of the partial power DC-DC converter (1). In addition, an input capacitor (15) connecting the first voltage input (7) to the input reference (8) and an output capacitor (16) connecting the first voltage output (9) to the output reference (10) are provided. In addition, an output inductor (17) connecting the positive output (5) of the DC-DC converter (2) with the first voltage output (9) is provided. Furthermore, in this exemplary embodiment the DC-DC converter (2) is bidirectional in power, which allows both charging and discharging of the battery (15).

Example 2: Implementation of the Partial Power DC-DC Converter in Conjunction with a Battery Array FIG. 4 further illustrates a schematic diagram of an implementation of the partial power DC-DC converter in conjunction with a battery array (13). The connections are made as described in Example 1.

In this example, the DC-DC converter (2) is a galvanically isolated converter and includes a transformer (21) having a primary and a secondary. A first H-bridge (22), formed by four unidirectional switches, is connected to the primary of the transformer (21), and a second H-bridge (23), formed by four bidirectional switches, is connected to the secondary of the transformer (21). In addition, an output inductor (17) is provided that connects the positive output (5) of the DC-DC converter (2) to the first voltage output (9).

The invention claimed is:

1. A partial power DC-DC converter with controllable topology (1), CHARACTERIZED in that it comprises:
   a galvanically isolated DC-DC converter (2) having a positive input (3), a negative input (4), a positive output (5), and a negative output (6);
   a first DC voltage input (7) electrically connected to said negative output (6) of said DC-DC converter (2);
   an input reference (8);
   a first DC voltage output (9) electrically connected to said positive output (5) of said DC-DC converter (2); and
   an output reference (10) electrically connected to said input reference (8) and to said negative input (4) of said DC-DC converter (2);
   wherein said partial power DC-DC converter (1) additionally comprises:
   a first switch (11) arranged to selectively connect said first DC voltage input (7) to said positive input (3) of said DC-DC converter (2); and
   a second switch (12) arranged to selectively connect said positive output (5) of said DC-DC converter (2) with said positive input (3) of said DC-DC converter (2); and
   wherein said DC-DC converter (2) is bidirectional in power and bipolar in voltage.

2. The partial power converter of claim 1, CHARACTERIZED in that said first switch (11) and said second switch (12) are unidirectional switches.

3. The partial power converter of claim 2, CHARACTERIZED in that each of said unidirectional switches is formed by a field effect transistor parallel to a rectifier diode.

4. The partial power converter of claim 1, CHARACTERIZED in that said first switch (11) and said second switch (12) are bidirectional switches.

5. The partial power converter of claim 1, CHARACTERIZED in that said interconnected partial power DC-DC converter (2) is selected from the group consisting of forward converters, push-pull converters, H-bridge converters, flyback converters, half bridge converters, and Ćuk converters.

6. The partial power converter of claim 1, CHARACTERIZED in that said DC-DC converter (2) comprises a transformer (21) having a primary and a secondary, a first H-bridge (22) connected to the primary of said transformer, and a second H-bridge (23) connected to the secondary of said transformer (21).

* * * * *